Aug. 5, 1947.     H. J. LUEHRS     2,425,039
SHEET CUTTING AND CREASING PRESS
Filed Aug. 25, 1944     13 Sheets-Sheet 1

INVENTOR.
Hans J. Luehrs
BY
attorneys

Fig. 1.

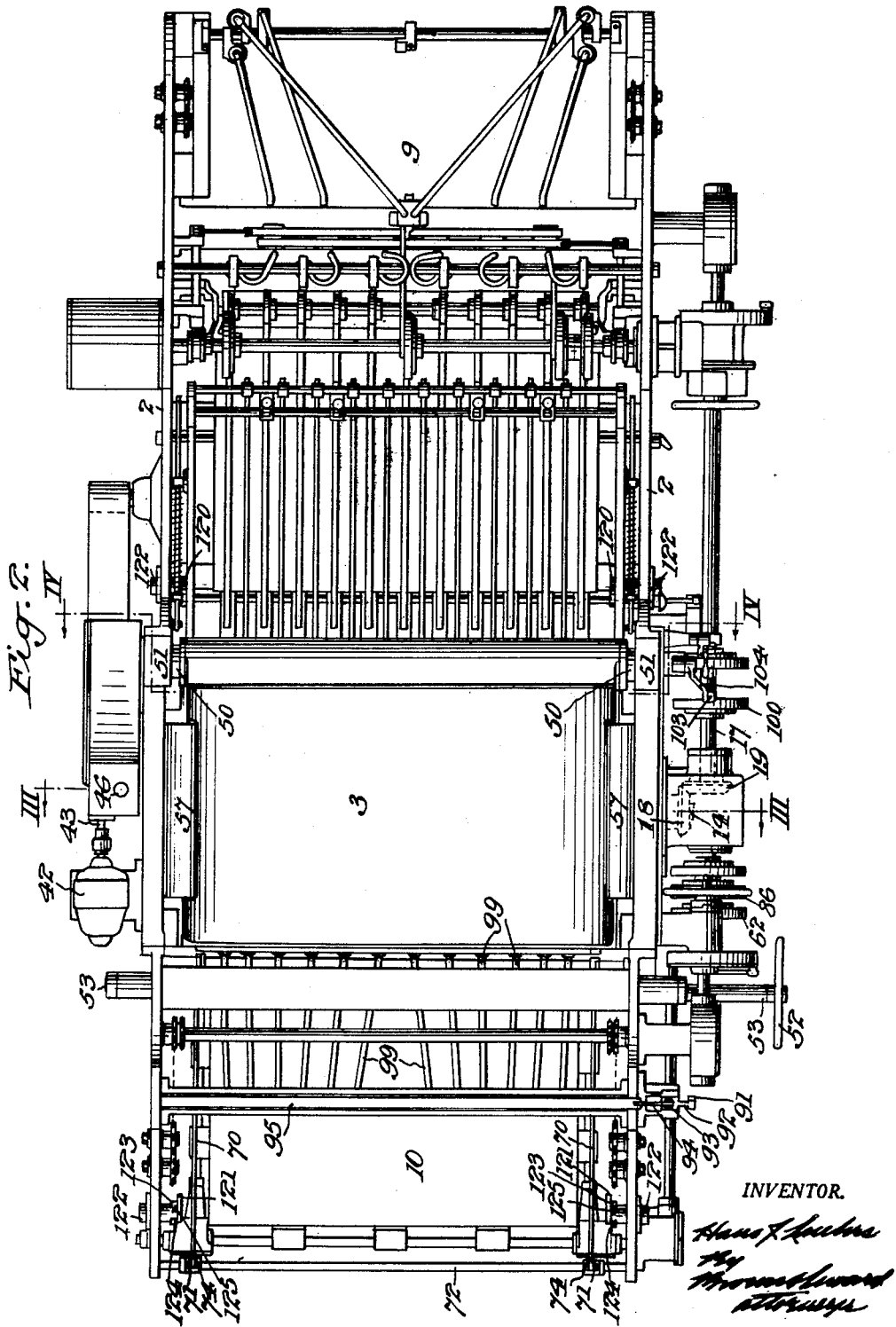

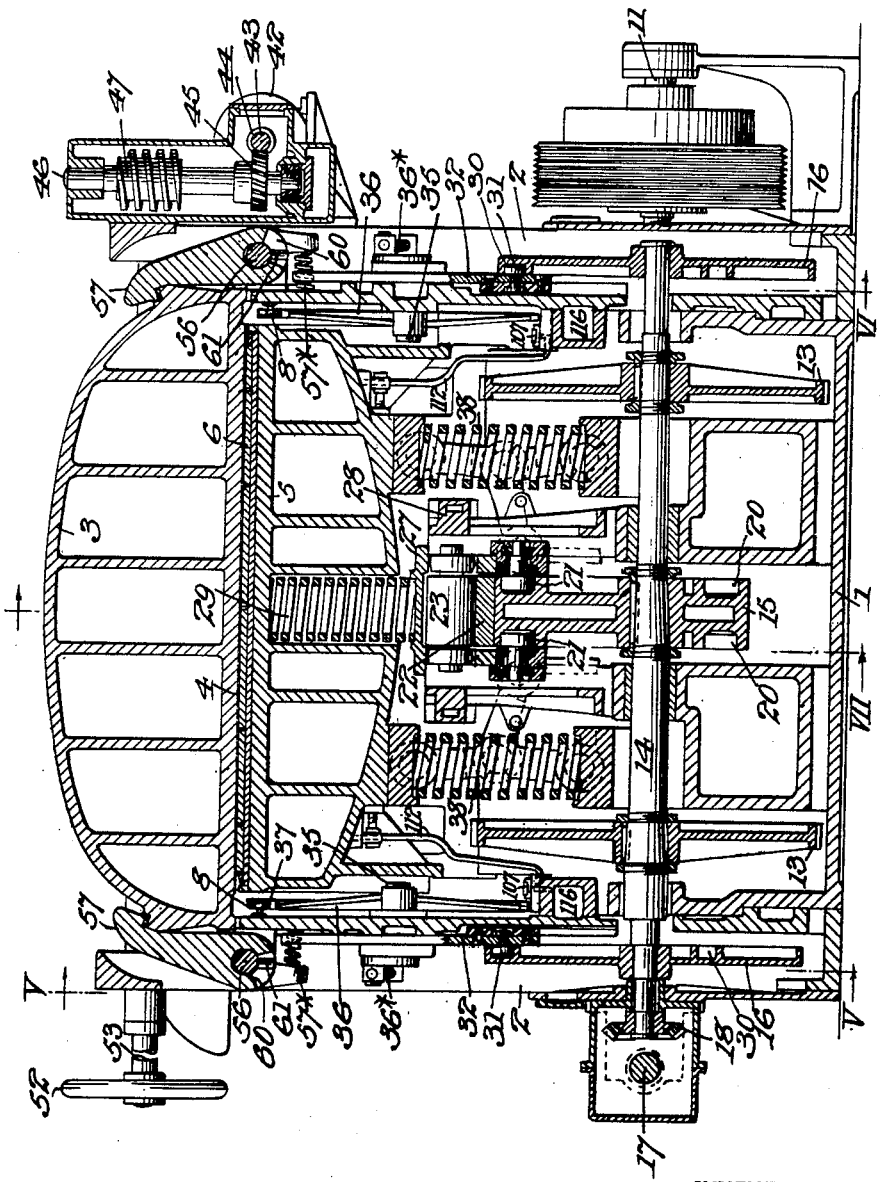

Aug. 5, 1947. H. J. LUEHRS 2,425,039
SHEET CUTTING AND CREASING PRESS
Filed Aug. 25, 1944 13 Sheets-Sheet 4
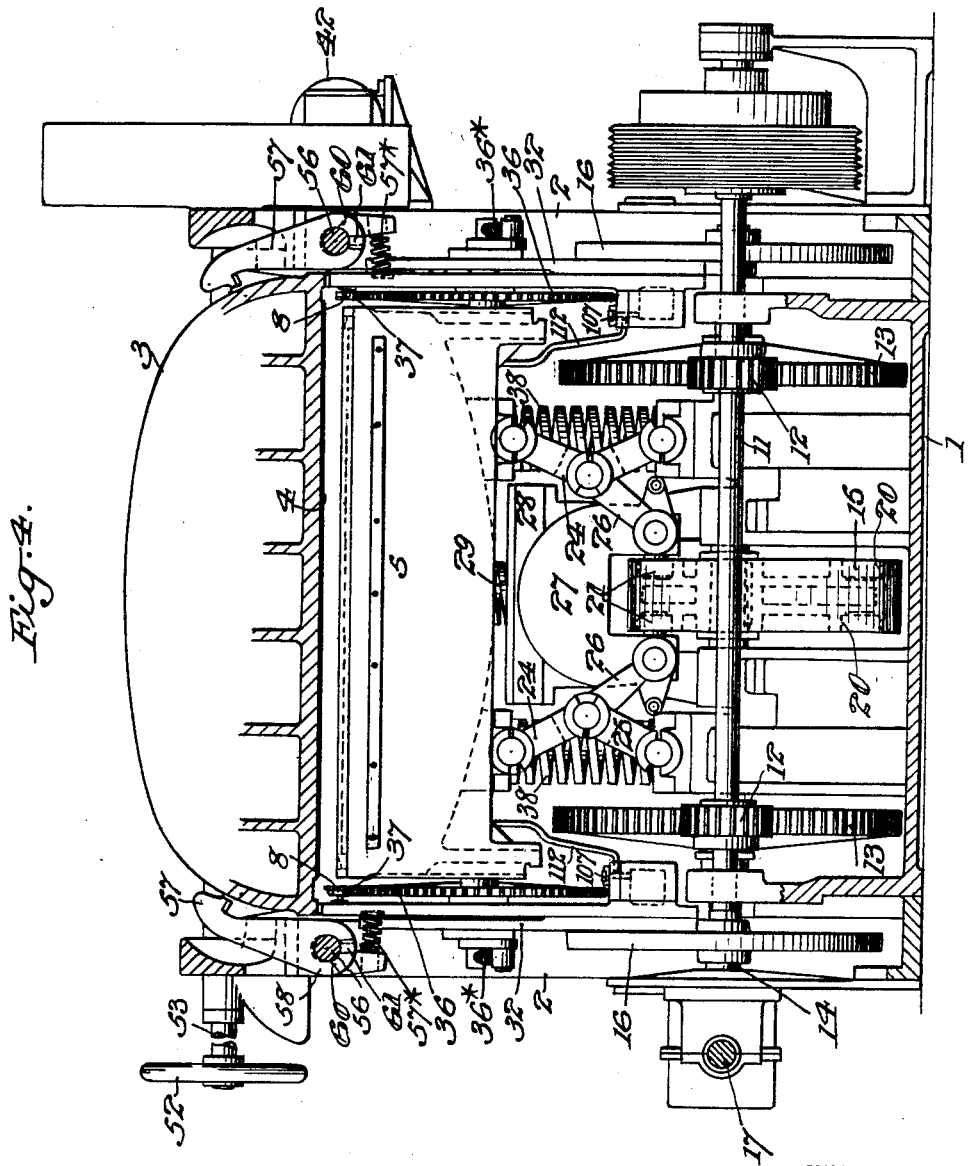
INVENTOR.

Aug. 5, 1947.  H. J. LUEHRS  2,425,039
SHEET CUTTING AND CREASING PRESS
Filed Aug. 25, 1944   13 Sheets-Sheet 5
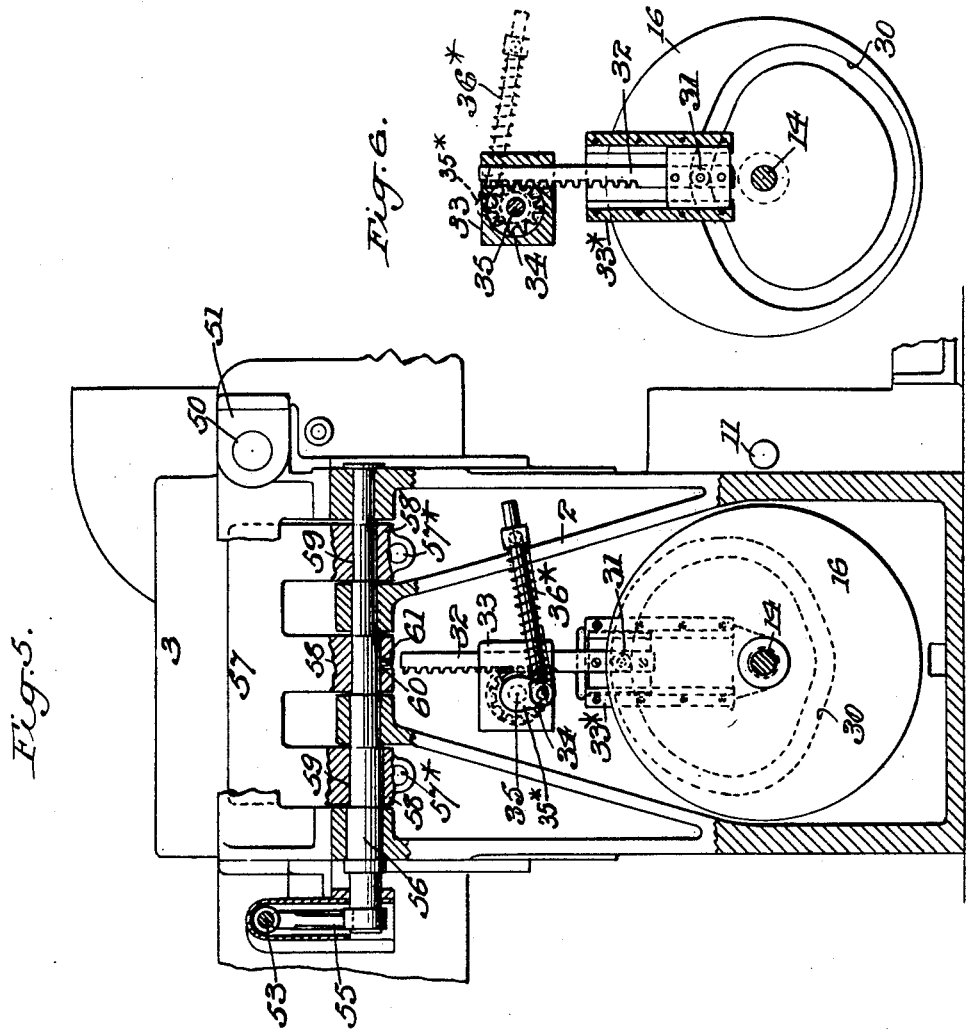
INVENTOR.
Hans J Luehrs
BY
attorneys Aug. 5, 1947.                    H. J. LUEHRS                    2,425,039
                        SHEET CUTTING AND CREASING PRESS
                   Filed Aug. 25, 1944           13 Sheets-Sheet 6

INVENTOR.

Aug. 5, 1947.    H. J. LUEHRS    2,425,039
SHEET CUTTING AND CREASING PRESS
Filed Aug. 25, 1944    13 Sheets-Sheet 7
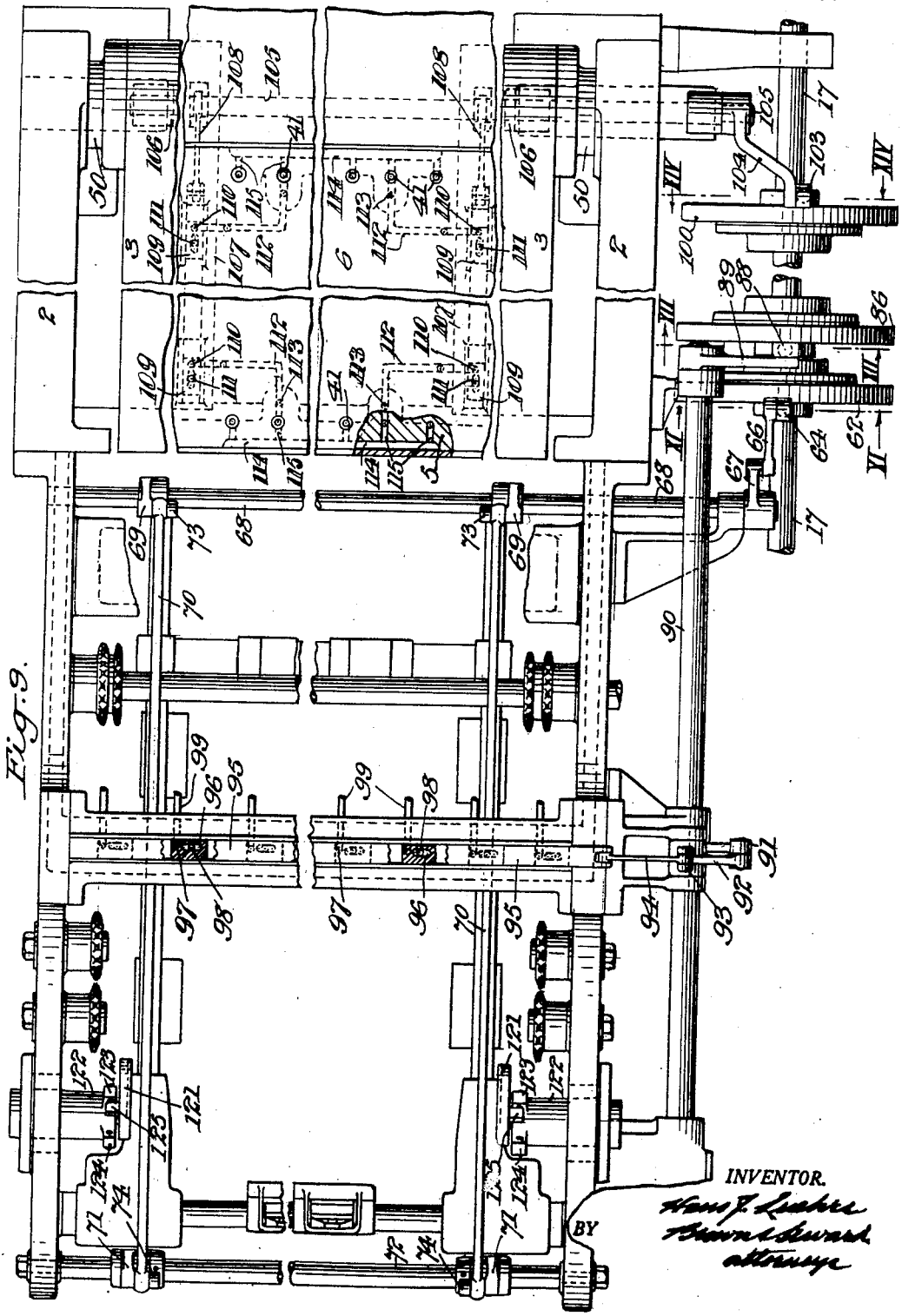
INVENTOR.

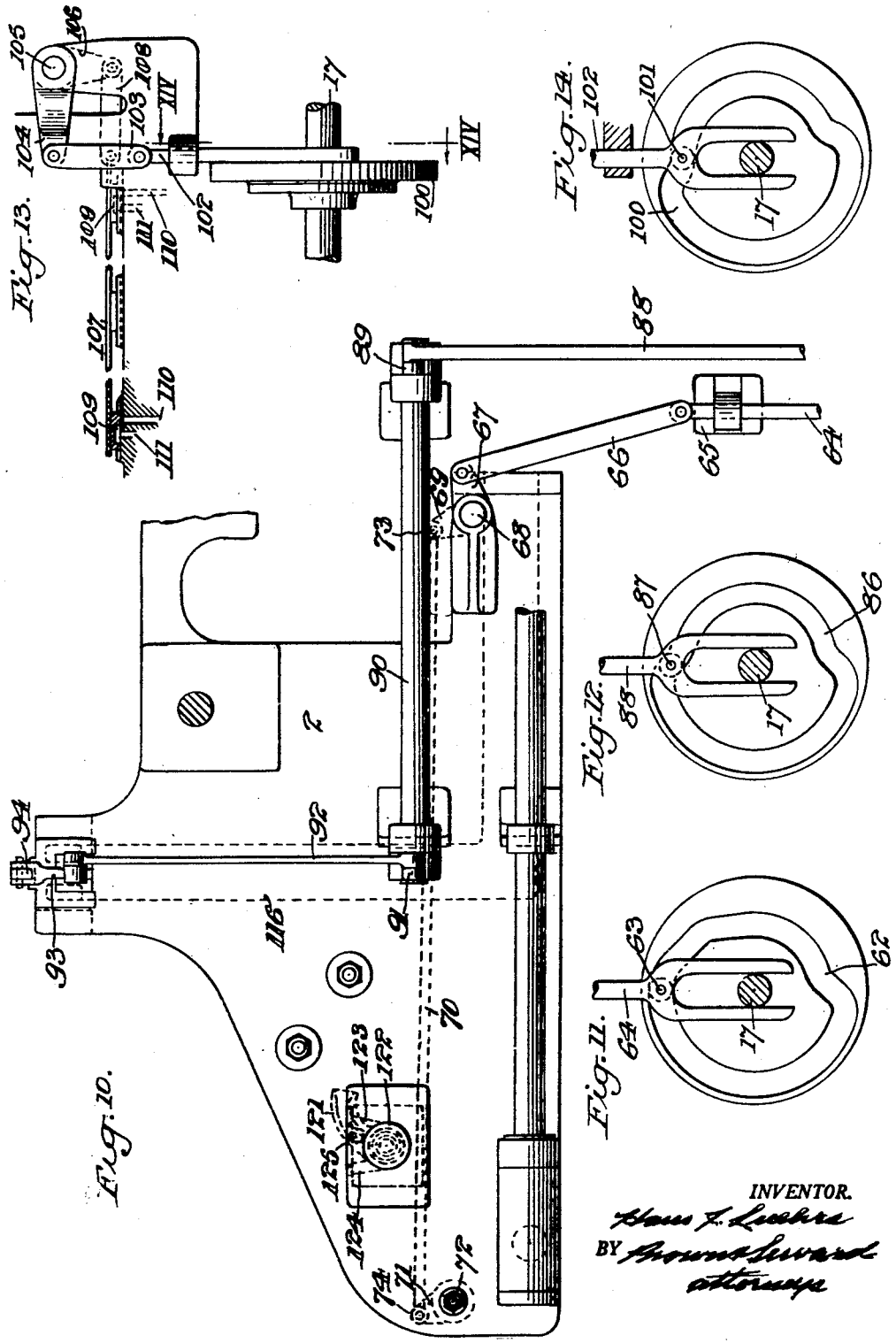

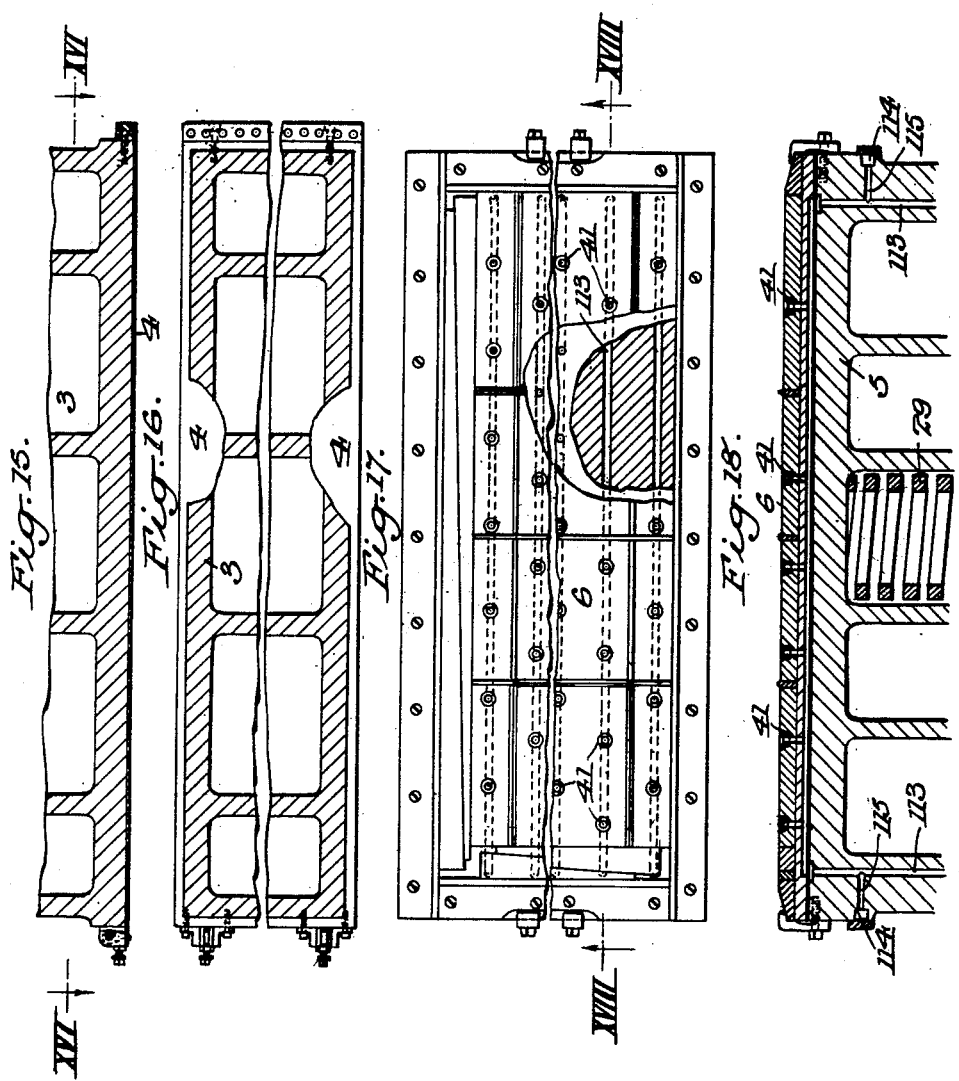

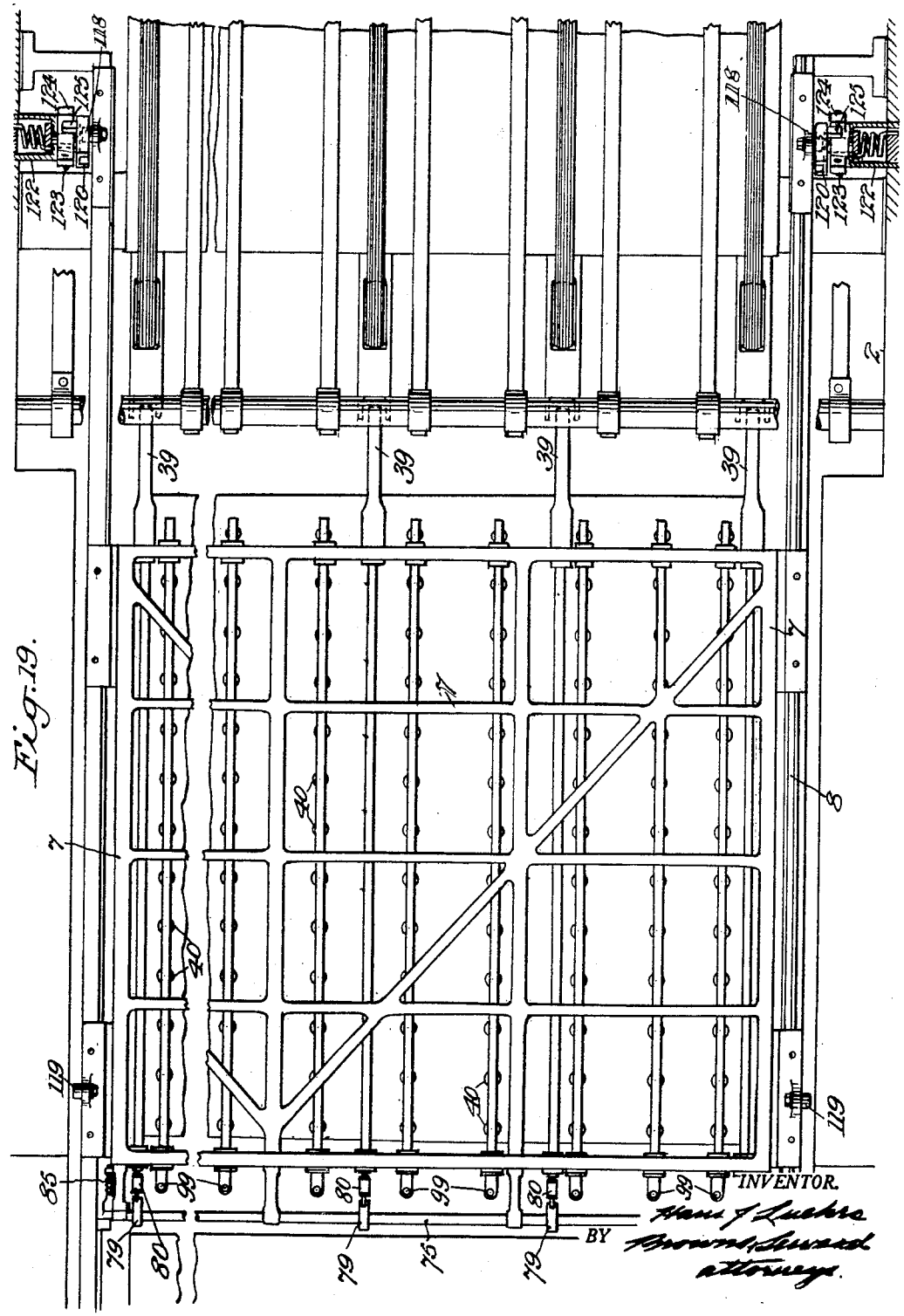

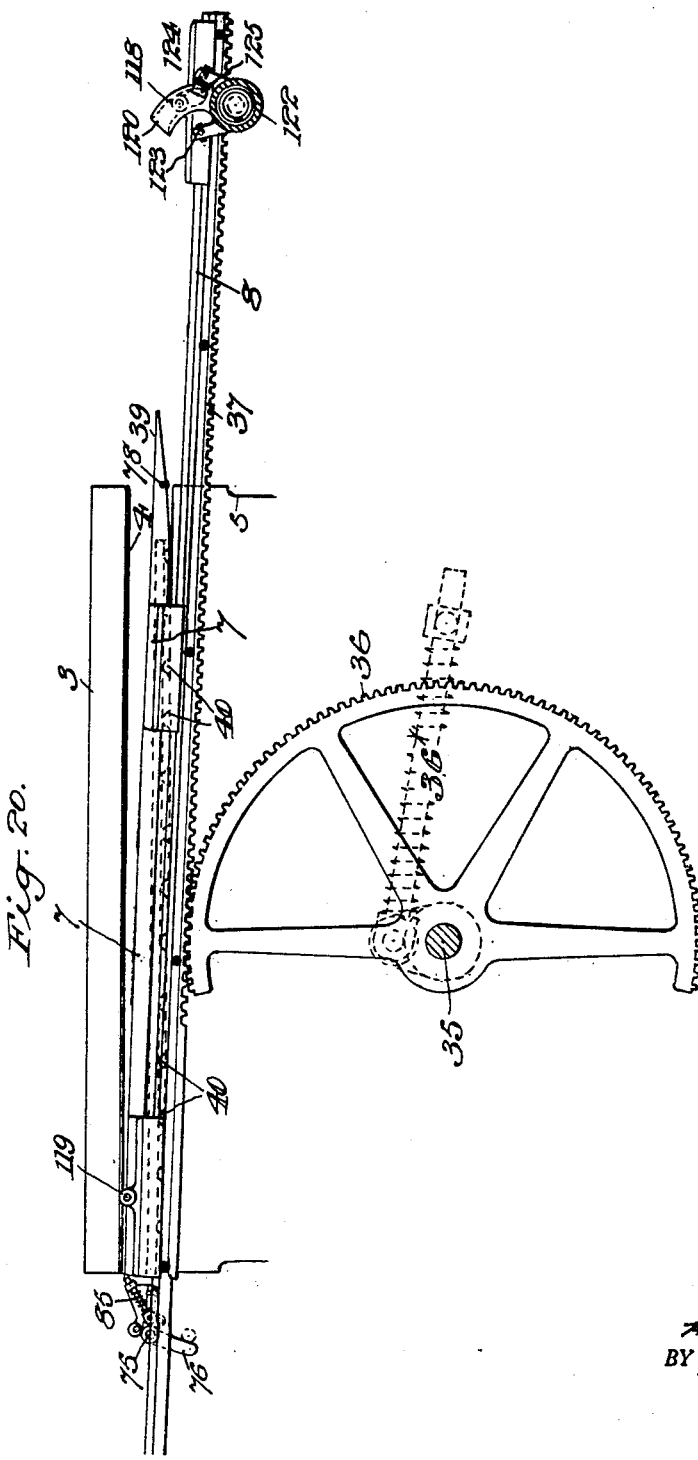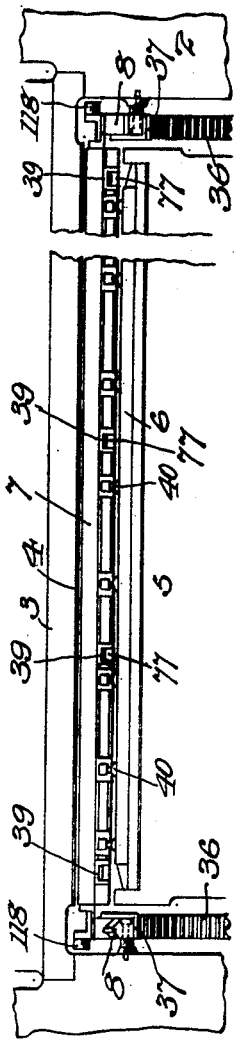

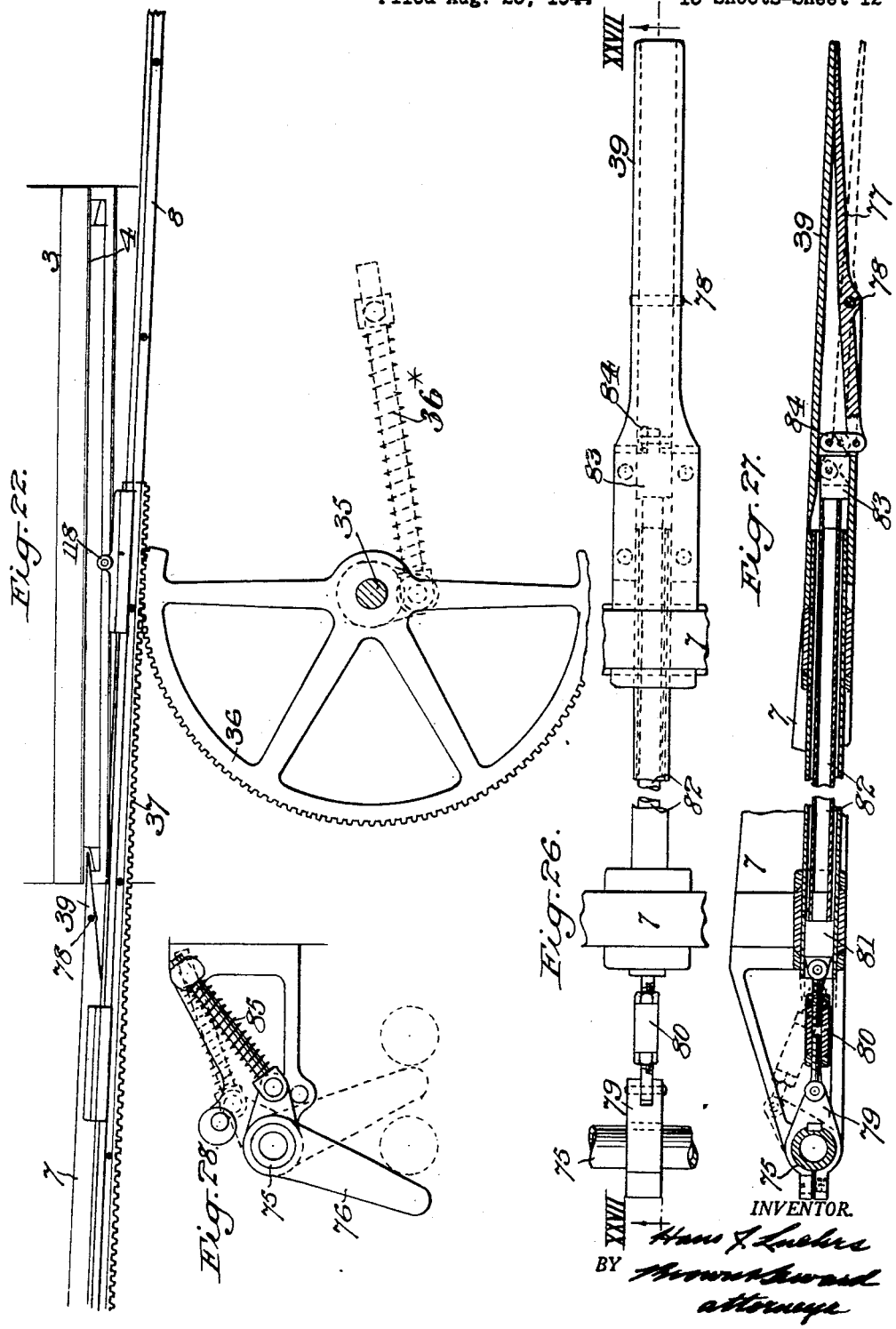

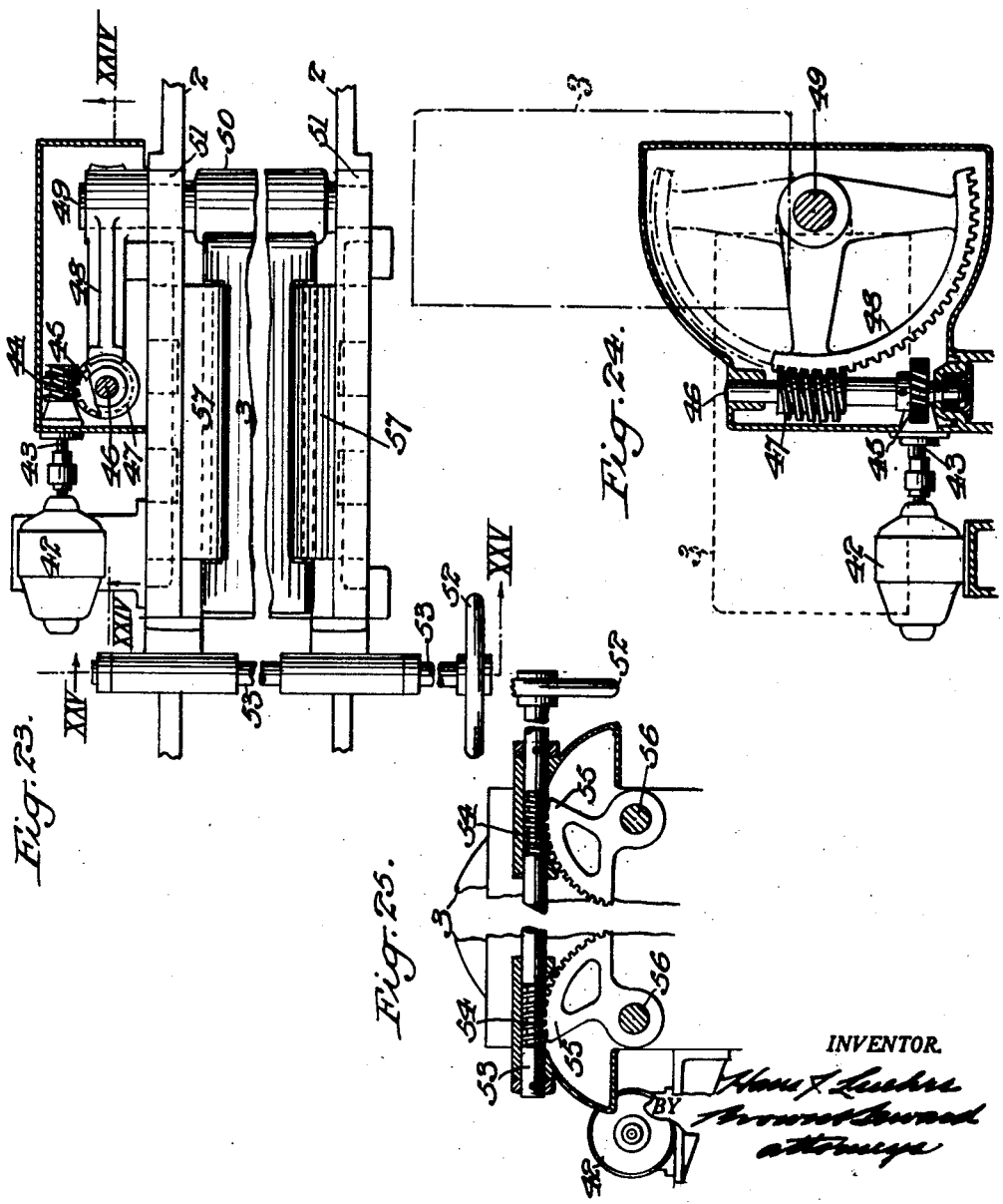

Patented Aug. 5, 1947

2,425,039

UNITED STATES PATENT OFFICE 2,425,039

SHEET CUTTING AND CREASING PRESS

Hans J. Luehrs, Westerly, R. I., assignor to C. B. Cottrell & Sons Company, Westerly, R. I., a corporation of Delaware Application August 25, 1944, Serial No. 551,098

36 Claims. (Cl. 164—21)

In sheet cutters and creasers of the bed and cylinder type the speed of the machine is limited because of the high inertia forces of the necessarily heavy reciprocating bed which travels a considerable distance during its forward and return strokes.

By the use of platen presses the speed of the machine may be materially increased due to the decreased inertia forces of the reciprocating platen which may be moved a comparatively short distance on its upward and downward strokes.

My invention consists in improvements in presses of the platen type whereby the strokes of the movable platen and of the sheet handling carriage may be kept at a minimum, thereby materially decreasing the inertia forces of the said platen and carriage and increasing the production speed of the press without sacrificing the known desirable features of the bed cylinder type of press.

My invention also consists in providing means whereby excessive deflection of the platens under the increased cutting and creasing pressures is prevented, and in providing means for ensuring conformity of any slight deflection of the platens which might be caused by the said increased cutting and creasing pressures.

My invention also consists in providing means for obtaining the maximum degree of accessibility to the cutter plate and die carried by the platens.

My invention also includes certain other improvements in the construction, arrangement and operation of the several parts of the press as will hereinafter more fully appear.

One object of my invention is to provide novel means whereby the reciprocating movements of the sheet handling carriage and the movable platen are so co-related as to permit a short movement of the platen and of the sheet handling carriage to thereby reduce the inertia forces to a minimum.

Another object of my invention is to provide novel means whereby the sheet handling carriage may be reciprocated in a straight line with a dwell at the beginning of its forward stroke to feed-in a new sheet and to take the preceding cut and creased sheet from the lower platen; another dwell near the end of said stroke at the sheet cutting and creasing position and to deliver the preceding cut and creased sheet; and a slight additional movement to open the sheet taking grippers on the carriage and move them beyond the leading end of the newly cut and creased sheet to permit the free return stroke of the empty carriage.

A further object is to provide novel means for locking and unlocking the upper platen and additional novel means for subsequently swinging the unlocked platen open to a substantially vertical position to gain convenient access to the cutter plate and die for make-ready, etc., and for swinging the platen from its open to its closed position.

A further object is to provide novel means for reciprocating the lower platen in which an additional means is provided for carrying the load during the sheet cutting and creasing operation.

A further object is to provide novel means for operating the sheet grippers and suction devices on the carriage and the suction devices on the lower platen in timed relation.

A further object is to provide means for bringing the lower platen into and out of contact with the suction devices on the carriage during the dwell of the carriage at its newly fed sheet taking position to transfer the preceding cut and creased sheet to the said carriage to be forwarded thereby to the delivery.

A practical embodiment of my invention is represented in the accompanying drawings in which:

Fig. 1 represents a side view of the press with its feeder and delivery;

Fig. 2 represents a plan view of the same;

Fig. 3 represents a transverse vertical section, on an enlarged scale, taken in the plane of the line III—III of Fig. 2;

Fig. 4 represents a transverse section on the same scale as Fig. 3, taken in the plane of the line IV—IV of Fig. 2;

Fig. 5 represents a vertical transverse section taken in the plane of the line V—V of Fig. 3;

Fig. 6 represents a detail vertical transverse section, taken in the plane of the line VI of Fig. 3 with the moving element in another position from that shown in Fig. 5;

Fig. 7 represents a vertical longitudinal section, taken in the plane of the line VII—VII of Fig. 3;

Fig. 8 represents a similar section with the moving elements in another position;

Fig. 9 represents a detail plan view partly in section, on an enlarged scale, of the press and delivery;

Fig. 10 represents a detail side elevation of the delivery showing the mechanisms for operating the sheet grippers and suction devices on the reciprocating sheet handling carriage;

Fig. 11 represents a detail vertical section, taken in the plane of the line XI—XI of Fig. 9, showing the cam for operating the sheet grippers on the carriage.

Fig. 12 represents a detail vertical section, taken in the plane of the line XII—XII of Fig. 9, showing the cam for controlling the operation of the suction devices on the carriage.

Fig. 13 represents a detail side elevation showing the mechanism for operating the suction devices on the movable lower platen.

Fig. 14 represents a detail vertical section, taken in the plane of the line XIV—XIV of Fig. 13;

Fig. 15 represents a detail vertical longitudinal section of the fixed upper platen.

Fig. 16 represents a detail horizontal section, taken in the plane of the line XVI—XVI of Fig. 15.

Fig. 17 represents a detail plan view partly in section of the lower platen and its die.

Fig. 18 represents a vertical section, taken in the plane of the line XVIII—XVIII of Fig. 17;

Fig. 19 represents a detail plan view of the carriage and its sheet handling grippers and suction devices.

Fig. 20 represents a detail vertical section showing the carriage and a portion of the means for reciprocating it, the parts being in position to take the newly fed sheet.

Fig. 21 represents a detail end view of the same.

Fig. 22 represents a view similar to Fig. 20, with the moving elements in position to cut and crease the sheets.

Fig. 23 represents a detail plan view partly in section, of the power means for swinging the upper platen, when unlocked, to its opened and closed positions.

Fig. 24 represents a detail vertical section taken in the plane of the line XXIV—XXIV of Fig. 23;

Fig. 25 represents a detail vertical section, taken in the plane of the line XXV—XXV of Fig. 23, showing a portion of the manually operated means for unlocking the upper platen;

Fig. 26 represents a detail plan view of a gripper on an enlarged scale;

Fig. 27 represents a longitudinal section taken in the plane of the line XXVII—XXVII of Fig. 26; and Fig. 28 represents a detail side elevation of the gripper actuating means.

The press frame comprises, generally, the base 1 and the side frames 2. The stationary upper platen 3 is shown as provided with a removable cutter plate 4 and the vertically movable lower platen 5 as provided with a removable die 6 for periodic coaction with the cutter plate 4 to cut and crease succeeding sheets. This lower platen 5 is shown as mounted to reciprocate vertically.

The reciprocating sheet handling carriage 7 is shown as slidable in a straight line on the rails of the tracks 8, 8 which tracks are inclined forwardly and upwardly from the sheet feeder 9 to the sheet delivery 10. The feeder and delivery will not be specifically described nor claimed herein as they form no part of the present invention.

The power driven main drive shaft 11 of the press is shown as provided with two pinions 12 adjacent the side frames 2, which pinions mesh with their two gears 13 fast on the main cam shaft 14. This main cam shaft carries the cam 15 for reciprocating the lower platen, which cam is located about midway between the side frames. This main cam shaft also carries two carriage reciprocating cams 16 for reciprocating the sheet handling carriage 7, which cams are located adjacent the side frames. This main cam shaft 14 is shown as driving the auxiliary cam shaft 17 through the bevel gears 18, 19, which auxiliary cam shaft carries the cams for controlling the operation of the several sheet handling devices.

The lower platen reciprocating cam 15 is shown as having two cam grooves 20 of the same shape and also the same angular position with respect to the cam shaft 14, in which grooves 20 the smaller cam rollers 21 travel. This cam 15 is also shown as having a renewable short peripheral cam surface 22 of wear resisting material, as hardened steel, which cam surface periodically engages a larger cam roller 23 for carrying the load during the sheet cutting and creasing operation.

These cam rollers 21 and 23 are operably connected to the lower platen by the following means. Two toggle levers are interposed between the lower platen 5 and the base 1 of the press frame at points spaced inwardly from the sides of the lower platen and between the vertical planes through the side supports for the fixed upper platen to eliminate the effect of the upward central deflection of the upper platen, to avoid the downward central deflection of the lower platen and to ensure conformity of any slight deflection of both platens in relation to each other which might be caused due to the increased cutting and creasing pressures. Each toggle lever comprises pivotally connected upper and lower members 24 and 25, the upper member 24 being also pivoted to the lower platen 5 and the lower member 25 to the said base 1. Two links 26 project from the pivotal connections of the upper and lower members 24 and 25 of their respective toggle levers. These links are also pivoted to a frame 27 which carries the cam rollers 21 and 23. This roller frame 27 is shown as a yoke which is vertically reciprocated in the guides 28 uprising from the base 1 by the action of the cam grooves 20 on the cam rollers 21, which cam grooves impart a gradually increasing upward movement and a gradually decreasing downward movement to the lower platen during its operative cycle.

A heavy coil spring 29 is located between the lower platen and the frame 27 to exert pressure on the cam rollers 21 and 23 to keep them in contact with their cam surfaces and to thereby eliminate lost motion.

The sheet handling carriage 7 is shown as reciprocated, with the proper dwells, in an inclined straight line by the following means. Each of the carriage reciprocating cams 16 has a properly shaped cam groove 30 in which a roller 31 travels. This cam roller 31 is carried by a rack bar 32 vertically slidable in upper and lower guides 33 and 33* on the side frame 2, the teeth of which rack bar engage a pinion 34 on a shaft 35 which carries a toothed segment 36. Overthrow springs 36* are connected to cranks 35* (see Figs. 5 and 6) on the shaft 35 for yieldingly holding the segments at the limits of their throw and to eliminate backlash thereon. These two segments 36 mesh with rack bars 37 extending along and secured to the sides of the said carriage 7. The shape of these carriage reciprocating cams 16 is such that the carriage is moved at a faster speed on its return stroke and at a slower speed on its forward stroke with a dwell at its position to take a newly fed sheet and the preceding cut and creased sheet, a dwell at its position for cutting and creasing the newly fed sheet and delivering the previously cut and creased sheet and with a short added movement at the finish of its forward stroke to open sheet grippers on the carriage and move them beyond the leading end of the said newly fed-in sheet after it has been cut and creased.

The weight of the movable lower platen 5 is shown as partly counterbalanced to relieve to a considerable degree the strain on the platen operating means. In the present instance I have shown heavy coil springs 38 located between the lower platen and the base 1 upon opposite sides of the platen operating cam 15 and in line with the toggle levers.

The means on the carriage 7 for handling the newly fed-in sheet and the preceding cut and creased sheet comprises the sheet grippers 39 and the suction devices 40.

The sheet grippers 39 are disposed across the rear end of the carriage 7 in position to be closed to grasp a new sheet from the feeder 9 during the dwell at the beginning of the forward stroke of the carriage and to release the said sheet as it reaches its sheet cutting and creasing position just before the end of the forward stroke of the carriage.

The suction devices 40 on the carriage 7 are disposed in position to take the preceding cut and creased sheet from the die 6 on the lower platen 5 during the dwell at the start of the forward movement of the carriage and during the forward stroke convey the said preceding cut and creased sheet forwardly to its delivery position at the same time as the new sheet is fed-in to its cutting and creasing position.

Suction devices 41 are also provided in the die 6 on the lower platen 5 for holding the newly fed-in sheet on the die 6 during the cutting and creasing operation and also during the return stroke of the carriage 7 and until the suction devices 40 on the carriage engage the preceding cut and creased sheet to lift it from the die.

The inner wall of the cam groove 20 is shaped at 20* to move the lower platen a short distance upwardly from its lowered position, during the dwell of the carriage at its feeding-in position, to bring the preceding cut and creased sheet on the lower platen into contact with the suction devices 40 on the carriage and to then move the platen downwardly a short distance from the carriage to permit the free forward movement of the cut and creased sheet.

Ready access to the die and cutter plate may be provided for by providing manual means for releasably locking the upper platen in its operative position and power means for swinging the unlocked platen to its opened and closed positions.

The power means for opening and closing the upper platen is shown as including a motor 42 whose shaft 43 is connected by a worm 44 to the lower worm gear 45 on the vertical shaft 46. The upper worm 47 on its shaft 46 meshes with a toothed segment 48 fixed to one of the journals 49 projecting from the ends of an offset portion 50 of the upper platen, which journals are mounted in suitable bearings 51 in the side frames 2.

The manual means for releasably locking the upper platen, under pressure, in its closed or operative position includes a hand wheel 52 on the hand shaft 53, which hand shaft is provided with two worms 54 which mesh with two toothed segments 55 carried by the eccentric rock shafts 56. Platen engaging hooks 57 have their hubs 58 mounted for a limited rotary movement on the eccentric portions 59 of the rock shafts 56, in the present instance by providing the hooks with circumferentially elongated slots 60 and the said eccentric portions of the rock shafts 56 with pins 61 which project into said slots. The eccentric mounting of the platen hooks 57 will cause the hooks to exert additional pressure on the closed upper platen to hold it firmly in said closed position. At the end of their limited movement on the shafts 56 the platen hooks may be swung out of their platen locking position by the further rotary movement of the rock shafts in the proper direction. The first portion of the releasing movement of the hooks will remove the pressure of the hooks on the upper platen and thus permit the hooks to be swung freely to their released position. Springs 57* serve to urge the hooks 57 toward their locking position.

The several mechanisms for operating the sheet grippers 39, the suction devices 40 and the suction devices 41 at the proper times will now be described.

The means for operating the sheet grippers 39 on the carriage 7 at the proper times to feed-in and to release the newly fed sheet comprises the following elements. The auxiliary cam shaft 17 is shown as provided with a box cam 62 in the groove of which there is located a roller 63 carried by a vertically slidable rod 64, the upper portion of which rod is guided in a bracket 65. The upper end of the rod 64 is connected by a link 66 to one arm 67 of a rock lever fast on a rock shaft 68, the other arms 69 of which rock lever are connected by rods 70 to uprising arms 71 journaled on a cross tie shaft 72. The uprising arms 69 are provided with rollers 73 for controlling the closing of the sheet grippers 39 to take a newly fed sheet, and the arms 71 are provided with rollers 74 for controlling the opening of the grippers when the newly fed sheet reaches its cutting and creasing position on the forward stroke of the carriage.

The sheet grippers 39 are opened and closed by the engagement of the rollers 73, 74 with the arms 76 which depend from the gripper cross shaft 75 at the proper times in the reciprocation of the carriage. The movable jaws 77 of the grippers 39 are pivoted at 78 and they are connected to the arms 79 of the cross shaft 75 by means of adjustable links 80, blocks 81, connecting rods 82, blocks 83 and links 84. Overthrow springs 85 are provided for holding the grippers through the shaft 75 in either their open or closed position.

The means for operating the suction devices 40 on the carriage 7 at the proper times to take a preceding cut and creased sheet from the die and to deliver the sheet comprises the following elements. The suction devices 40 on the carriage are operated from the auxiliary cam shaft 17, which cam shaft is provided with a box cam 86 in the groove of which there is located the roller 87 which is carried by a forked rod 88 connected at its upper end to an arm 89 on a cross shaft 90. This cross shaft has another arm 91 connected by a vertical rod 92 to an arm 93 pivoted on the press frame, which arm 93 is connected by a link 94 to a slide valve 95 having a series of bridge ports 96 for opening and closing the suction passages 97 to atmosphere through the ports 98.

The suction passages 97 are flexibly connected by tubes 99 to the suction devices 40 on the carriage.

The means for operating the suction devices 41 through the die 6 on the lower platen to hold a newly fed sheet thereon during the cutting and creasing operation and during the return stroke of the carriage and to then release the sheet, comprises the following elements.

The auxiliary cam shaft 17 is provided with a box cam 100 in the groove of which there is located a roller 101 carried by a vertically slidable rod 102, the upper end of which rod is connected by a link 103 to an arm 104 fast on the cross shaft 105. This cross shaft 105 is provided with depending arms 106 connected to the slide bars 107 by links 108. Each of the slide bars 107 is provided with two slide valves having bridge ports 109 for opening and closing the suction passages 110 to the atmosphere through the ports 111. These suction passages 110 are flexibly connected by tubes 112 leading to the suction devices 41 through passages 113, transverse auxiliary manifolds 114 and passages 115. The suction devices 40 and 41 are in open communication with a common manifold 116 which manifold is connected through a pipe 117 to a power driven vacuum pump, not shown (see Figs. 7 and 8).

Shock absorbing means are provided for the sheet handling carriage at the ends of its forward and rearward strokes, which means includes the following elements. The sides of the carriage are shown as provided with two rollers 118 at its rear end and two rollers 119 at its front end. The press side frames 2 are shown as provided with two spring pressed yielding cams 120 for engagement by the carriage rollers 118 and with two spring pressed yielding cams 121 for engagement by the carriage rollers 119 (see Figs. 9 and 19). Each of these spring pressed cams is pivoted in a bracket 122 on the side frame, said bracket being provided with stops 123, 124 for engagement with a lug 125 on the cam to limit its swinging movement.

In operation, the sheets to be cut and creased are fed one by one into proper end and side register by the feeder 9 to be taken by the sheet grippers 39 on the rear end of the carriage 7 as the carriage dwells at the start of its forward stroke. At the same time the lower platen is slightly moved upwardly to bring the preceding cut and creased sheet into contact with the suction devices 40 on the carriage. The suction devices 41 in the die on the lower platen 5 are then operated to release the preceding cut and creased sheet from the die and the suction devices 40 on the carriage 7 are operated to take and hold the released preceding cut and creased sheet on the carriage.

As the carriage 7 is moved forwardly and upwardly in a straight line along its inclined track 8 the grippers 39 will feed the new sheet into position to be cut and creased by the coaction of the lower and upper platens. On the same forward stroke of the carriage the suction devices 40 on the carriage will advance the preceding cut and creased sheet to its delivery point. The carriage is then caused to dwell a sufficient time to permit the die on the upwardly moving lower platen to cut and crease the newly fed-in sheet. The suction devices 40 on the carriage will be released to deliver the preceding cut and creased sheet, and the suction devices 41 in the die on the lower platen will be operated to hold the newly cut and creased sheet on the die.

The carriage is then moved a short distance forwardly to the end of its forward stroke for causing the sheet grippers 39 on the carriage to be opened to release the newly cut and creased sheet and moved just beyond the leading end of the said newly cut and creased sheet. The lower platen is then moved downwardly with its newly cut and creased sheet and the empty carriage is returned downwardly and rearwardly on its track 8 to its sheet feeding-in position. The cycle may then be repeated.

It will be understood that the reciprocating movements of the carriage and the lower platen are so timed with respect to each other that the cutting and creasing operation as well as the feeding-in and delivery operations may be accomplished with a minimum movement of the lower platen.

As the lower platen reaches its cutting and creasing position it will be seen that the cam surface 22 on the platen reciprocating cam 15 engages the larger cam roller 23 thus causing the cam 15 through its cam roller 23 to carry the load during the cutting and creasing operation.

If it be desired to gain access to the die and cutter plate for make-ready, etc., the upper platen may be released from its closed or operative position, under pressure, by operating the platen engaging hooks 57 to first release their pressure on the upper platen and to then be swung free of the upper platen. The reversible motor 42 may then be started in the direction to cause the motor to swing the unlocked upper platen to its open vertical position. When so desired the upper platen may be returned to its closed position by the reverse operation of the motor. The hand shaft 53 may then be turned by its hand wheel 52 to swing the hooks to their locking position and to then draw the hooks downward to exert the required pressure on the upper platen to firmly seat the same against the considerable upward pressure of the lower platen during the cutting and creasing operation.

The parts shown and described but not claimed herein form the subject matter of my two divisional applications filed May 16, 1945, and May 17, 1945, respectively, their Serial Nos. being 594,101 and 594,333.

It is evident that various changes may be resorted to in the construction, form and arrangement of the several parts without departing from the spirit and scope of my invention, and hence I do not intend to be limited to the particular embodiment herein shown and described, but what I claim is:

1. In a sheet cutting and creasing press, a sheet supply, upper and lower platens, means for periodically moving the lower platen into coaction with the upper platen to cut and crease successive sheets, a carriage, means for reciprocating it in a straight line, devices on said carriage operable to take a new sheet from the sheet supply and feed it in to the press, and other devices on the carriage operable at the same time to take the preceding cut and creased sheet presented to the carriage by the lower platen and to convey the sheet to its delivery point and then release the sheet.

2. In a sheet cutting and creasing press, a sheet supply, upper and lower platens, means for periodically moving the lower platen into coaction with the upper platen to cut and crease successive sheets, a carriage, means for reciprocating it in a straight line, devices on said carriage operable to take a new sheet from the sheet supply and feed it in to the press, and other devices on the carriage operable at the same time to take the preceding cut and creased sheet presented to the carriage by the lower platen and to convey the sheet to its delivery point and then release the sheet, and means for periodically moving the lower platen a short distance upwardly from its lowered position into position to transfer the cut and creased sheet to the said other devices on the carriage when in its new sheet taking position.

3. In a sheet cutting and creasing press, a sheet supply, upper and lower platens, means for periodically moving the lower platen into coaction with the upper platen to cut and crease successive sheets, a carriage, means for reciprocating it in a straight line which is inclined upwardly and forwardly with respect to a plane at right angles to the movement of the lower platen, devices on said carriage operable during the upward and forward stroke of the carriage to take a new sheet from the sheet supply and feed it in to the press, and other devices on the carriage operable at the same time to take the preceding cut and creased sheet presented to it by the lower platen and to convey the sheet to its delivery point and then release the sheet.

4. In a sheet cutting and creasing press, a sheet supply, upper and lower platens, means for periodically moving the lower platen upwardly into coaction with the upper platen to cut and crease successive sheets, a carriage, means for reciprocating it in a straight line which is inclined upwardly and forwardly with respect to a plane at right angles to the movement of the lower platen, devices on said carriage operable during the upward and forward stroke of the carriage to take a new sheet from the sheet supply and feed it in to the press, and other devices on the carriage operable at the same time to take the preceding cut and creased sheet presented to it by the lower platen and to convey the sheet to its delivery point and then release the sheet, and means for periodically moving the lower platen a short distance upwardly from its lowered position into position to transfer the cut and creased sheet to the said other devices on the carriage when in its new sheet taking position.

5. In a sheet cutting and creasing press, upper and lower platens, means for periodically moving the lower platen into coaction with the upper platen to cut and crease successive sheets, a carriage, means for reciprocating it in a straight line, said carriage having grippers and suction devices, the grippers being operable to take and feed-in a new sheet and the suction devices being operable at the same time to take the preceding cut and creased sheet presented to it by the lower platen and to deliver the sheet, said platen moving means being operable to move the platen slightly to transfer the cut and creased sheet to the carriage when in its new sheet taking position.

6. In a sheet cutting and creasing press, upper and lower platens, means for periodically moving the lower platen into coaction with the upper platen to cut and crease successive sheets, a carriage, means for reciprocating it in a straight line which is inclined upwardly and forwardly, said carriage having grippers and suction devices, the grippers being operable to take and feed-in a new sheet and the suction devices being operable at the same time to take the preceding cut and creased sheet presented to them by the lower platen and to deliver the sheet, said platen moving means being operable to move the platen slightly to transfer the cut and creased sheet to the carriage when in its new sheet taking position.

7. In a sheet cutting and creasing press, a sheet supply, upper and lower platens, means for periodically moving the lower platen upwardly into coaction with the upper platen to cut and crease successive sheets, a carriage, means for reciprocating it in a straight line, devices on said carriage operable to take a new sheet from the sheet supply and feed it in to the press and to release the sheet as it reaches its sheet cutting and creasing position and separate devices on the carriage operable at the same time to take the preceding cut and creased sheet presented to it by the lower platen and to convey the sheet to its delivery point and then release the sheet, and devices on the lower platen for holding the newly fed sheet thereon during the cutting and creasing operation.

8. In a sheet cutting and creasing press, a sheet supply, upper and lower platens, means for periodically moving the lower platen upwardly into coaction with the upper platen to cut and crease successive sheets, a carriage, means for reciprocating it in a straight line, devices on said carriage operable to take a new sheet from the sheet supply and feed it in to the press and to release the sheet as it reaches its sheet cutting and creasing position and separate devices on the carriage operable at the same time to take the preceding cut and creased sheet presented to it by the lower platen and to convey the sheet to its delivery point and then release the sheet, and means on the lower platen for holding the newly fed sheet thereon during the cutting and creasing operation and during the return stroke of the carriage and the downward stroke of the lower platen.

9. In a sheet cutting and creasing press, a sheet supply, upper and lower platens, means for periodically moving the lower platen upwardly into coaction with the upper platen to cut and crease successive sheets, a carriage, means for reciprocating it in a straight line, said carriage having grippers and suction devices, the grippers being operable to take a new sheet from the sheet supply and feed it in to the press and to release the sheet as it reaches its sheet cutting and creasing position and the suction devices being operable at the same time to take the preceding cut and creased sheet presented to them by the lower platen and to convey the sheet to its delivery point and then release the sheet, and suction devices on the lower platen for holding the newly fed sheet thereon during the cutting and creasing operation.

10. In a sheet cutting and creasing press, upper and lower platens, means for periodically moving the lower platen into coaction with the upper platen to cut and crease successive sheets, a carriage, means for reciprocating it in a straight line, said carriage having grippers and suction devices, the grippers being operable to take and feed-in a new sheet and the suction devices being operable at the same time to take the preceding cut and creased sheet presented to them by the lower platen and deliver the sheet, and suction devices on the lower platen for holding the newly fed sheet thereon during the cutting and creasing operation and during the return strokes of the carriage and the lower platen.

11. In a sheet cutting and creasing press, upper and lower platens, means for periodically moving the lower platen into coaction with the upper platen to cut and crease successive sheets, a carriage, means for reciprocating it in a straight line, said carriage having means operable to take and feed-in a new sheet and at the same time to take the preceding cut and creased sheet presented to it by the lower platen and to deliver the sheet, said platen and carriage reciprocating means including a rotary shaft and cams thereon operatively connected to their respective platen and carriage.

12. In a sheet cutting and creasing press, upper and lower platens, means for periodically moving the lower platen into coaction with the upper platen to cut and crease successive sheets, a carriage, means for reciprocating it in a straight line, said carriage having means operable to take and feed-in a new sheet and at the same time to take the preceding cut and creased sheet presented to it by the lower platen and to deliver the sheet, and means for partly counterbalancing the weight of the lower platen.

13. In a sheet cutting and creasing press, upper and lower platens, means for periodically moving the lower platen into coaction with the upper platen to cut and crease successive sheets, a carriage, means for reciprocating it in a straight line forwardly at a lower speed and rearwardly at a higher speed, said carriage having means operable during the forward stroke of the carriage to take and feed-in a new sheet and at the same time to take the preceding cut and creased sheet presented to it by the lower platen and to deliver the sheet.

14. In a sheet cutting and creasing press, a sheet supply, upper and lower platens, means for periodically moving the lower platen upwardly into coaction with the upper platen to cut and crease successive sheets, a straight track, a carriage, and means for reciprocating it on said track, devices on said carriage operable to take a new sheet from the sheet supply and feed it in to the press and separate devices operable at the same time to take the preceding cut and creased sheet presented to it by the lower platen and to convey it to its delivery point and then release the sheet.

15. In a sheet cutting and creasing press, a sheet supply, upper and lower platens, means for periodically moving the lower platen upwardly into coaction with the upper platen to cut and crease successive sheets, a straight track inclined upwardly and forwardly with respect to a plane at right angles to the movement of the lower platen, a carriage, and means for reciprocating it on devices on said track, said carriage operable during the forward stroke of the carriage to take a new sheet from the sheet supply and feed it in to the press and separate devices operable at the same time to take the preceding cut and creased sheet presented to it by the lower platen and to convey the sheet to its delivery point and then release the sheet.

16. In a sheet cutting and creasing press, upper and lower platens, means operatively connected to the lower platen for reciprocating it to cut and crease successive sheets, additional means for carrying the load during the cutting and creasing operation, a carriage and means for reciprocating it, said carriage having means operable to take and feed-in a new sheet and at the same time to take the preceding cut and creased sheet presented to it by the lower platen and to deliver the sheet.

17. In a sheet cutting and creasing press, upper and lower platens, a reciprocating carriage having means operable to feed-in a new sheet and deliver the preceding cut and creased sheet during the forward stroke of the carriage and means operatively connected to the lower platen for moving it into and out of coaction with the upper platen to cut and crease successive sheets and into and out of coaction with the carriage to transfer them thereto, and additional means for carrying the load during the cutting and creasing operation.

18. In a sheet cutting and creasing press, upper and lower platens, a reciprocating carriage having means operable to feed-in a new sheet and to deliver the preceding cut and creased sheet during the forward stroke of the carriage, a rotary cam having cam surfaces and their rollers operatively connected to the lower platen for reciprocating it into and out of coaction with the upper platen to cut and crease successive sheets and into and out of coaction with the carriage to transfer the sheets thereto and for carrying the load during the cutting and creasing operation.

19. In a sheet cutting and creasing press, upper and lower platens, a reciprocating carriage having means operable to feed-in a new sheet and to deliver the preceding cut and creased sheet, a cam having a cam groove, a roller traveling therein operatively connected to the lower platen for reciprocating it into and out of coaction with the upper platen and into and out of coaction with the carriage, said cam having a cam surface and a roller for engagement thereby for carrying the load during the cutting and creasing operation.

20. In a sheet cutting and creasing press, upper and lower platens, a reciprocating carriage having means operable to feed-in a new sheet and deliver the preceding cut and creased sheet, a cam having two cam grooves and an exterior cam surface, rollers traveling in the grooves operatively connected to the lower platen for reciprocating it into and out of coaction with the upper platen and into and out of coaction with the carriage and a roller for engagement by the exterior cam surface to carry the load during the cutting and creasing operation.

21. In a sheet cutting and creasing press, upper and lower platens, a reciprocating carriage having means operable to feed-in a new sheet and to deliver the preceding cut and creased sheet, a cam having two cam grooves and an exterior replaceable cam surface, rollers traveling in the grooves operatively connected to the lower platen for reciprocating it into and out of coaction with the upper platen and into and out of coaction with the carriage and a roller for engagement by the exterior cam surface to carry the load during the cutting and creasing operation.

22. In a sheet cutting and creasing press, upper and lower platens, a reciprocating carriage having means operable to feed-in a new sheet and deliver the preceding cut and creased sheet and means for reciprocating the lower platen into and out of coaction with the upper platen to cut and crease successive sheets and into and out of coaction with the carriage and for carrying the load during the cutting and creasing operation, said means including a rotary cam having cam surfaces and their rollers and a vertically movable roller frame in which said rollers are mounted, said frame being operatively connected to said lower platen.

23. In a sheet cutting and creasing press, upper and lower platens, a reciprocating carriage having means operable to feed-in a new sheet and deliver the preceding cut and creased sheet and means for reciprocating the lower platen into and out of coaction with the upper platen to cut and crease successive sheets and into and out of coaction with the carriage and for carrying the load during the cutting and creasing operation, said means including a rotary cam having cam surfaces and their rollers and a vertically movable roller frame in which said rollers are mounted, said frame being operatively connected to said lower platen, and a pressure spring interposed between the lower platen and the roller frame.

24. In a sheet cutting and creasing press, upper and lower platens, a reciprocating carriage having means operable to feed-in a new sheet and deliver the preceding cut and creased sheet and means for reciprocating the lower platen into and out of coaction with the upper platen to cut and crease successive sheets and into and out of coaction with the carriage and for carrying the load during the cutting and creasing operation, said means including a rotary cam having cam surfaces and their rollers, a vertically movable roller frame in which said rollers are mounted, and toggle levers operatively connecting the roller frame and upper platen.

25. In a sheet cutting and creasing press, upper and lower platens, a reciprocating carriage having means operable to feed-in a new sheet and deliver the preceding cut and creased sheet and means for reciprocating the lower platen into and out of coaction with the upper platen to cut and crease successive sheets and into and out of coaction with the carriage and for carrying the load during the cutting and creasing operation, said means including a rotary cam having cam surfaces and their rollers, a vertically movable roller frame in which said rollers are mounted, and four toggle levers operatively connecting the roller frame and lower platen, said toggle levers being connected to the lower platen at predetermined points to prevent excessive deflection of the platens during the cutting and creasing operation and to ensure conformity of any slight deflection of the platens.

26. In a sheet cutting and creasing press, upper and lower platens, a reciprocating carriage having means operable to feed-in a new sheet and deliver the preceding cut and creased sheet and means for reciprocating the lower platen into and out of coaction with the upper platen to cut and crease successive sheets and into and out of coaction with the carriage and for carrying the load during the cutting and creasing operation, said means including a rotary cam having cam surfaces and their rollers, a vertically movable roller frame in which said rollers are mounted, and toggle levers operatively connecting the roller frame and lower platen at distances inwardly from its sides to prevent excessive deflection of the platens during the cutting and creasing operation and to ensure conformity of any slight deflection of the platens.

27. In a sheet cutting and creasing platen press, a fixed upper platen, a reciprocable lower platen, a sheet handling carriage reciprocable between the platens in a straight line and operable to take and feed-in a new sheet and to take and deliver the preceding cut and creased sheet during the forward stroke of the carriage, and means including coacting rotary cams respectively operatively connected to the carriage and to the lower platen to reciprocate them in timed relation with a minimum travel of the lower platen.

28. In a sheet cutting and creasing press, a fixed upper platen, a reciprocable lower platen, a sheet handling carriage reciprocable between the platens in a straight line and operable to take and feed-in a new sheet and to take and deliver the preceding cut and creased sheet during the forward stroke of the carriage, and means including coacting rotary cams respectively operatively connected to the carriage and to the lower platen to reciprocate them in timed relation with a minimum travel of the lower platen, the carriage controlling cams causing the carriage to dwell to take a new sheet and to take the previously cut and creased sheet presented to it by the lower platen and to dwell again to permit the new sheet to be cut and creased and the preceding sheet to be delivered.

29. In a sheet cutting and creasing press, a fixed upper platen, a reciprocable lower platen, a sheet handling carriage reciprocable between the platens in a straight line and operable to feed-in a new sheet and to deliver the preceding cut and creased sheet during the forward stroke of the carriage, and means including coacting rotary cams operatively connected respectively to the carriage and the lower platen to reciprocate them in timed relation with a minimum travel of the lower platen, the carriage controlling cams causing the carriage to dwell to take a newly fed sheet and to take the preceding cut and creased sheet presented to it by the lower platen and to dwell again just before the carriage completes its forward stroke to permit the newly fed sheet to be cut and creased and the preceding sheet to be delivered.

30. In a sheet cutting and creasing press, upper and lower platens, means for periodically moving one platen into coaction with the other platen to cut and crease successive sheets, a carriage operable to feed-in a new sheet and to take a preceding cut and creased sheet from the lower platen and to deliver the preceding cut and creased sheet during the forward stroke of the carriage, and means for reciprocating the carriage at a slow speed on its forward stroke with dwells at the beginning and near the end of its stroke and at a rapid speed on its return stroke.

31. In a sheet cutting and creasing press, upper and lower platens, means for periodically moving the lower platen into coaction with the upper platen, a sheet supply, a delivery, a sheet handling carriage, and reciprocating means therefor, operable to cause the carriage to dwell at one limit of its stroke for taking a new sheet from the sheet supply and a previously cut and creased sheet presented to it by the lower platen, to travel in a straight line to convey the two sheets forwardly and to again dwell at nearly the other limit of its stroke to deposit the new sheet onto the lower platen and the previously cut and creased sheet onto the delivery and to complete its stroke and to then return the carriage to its original position.

32. In a sheet cutting and creasing press, upper and lower platens, means for periodically moving the lower platen into coaction with the upper platen to cut and crease successive sheets, a reciprocating carriage and sheet grippers and suction devices on the carriage, respectively operable to feed-in a new sheet and simultaneously deliver a preceding cut and creased sheet.

33. In a sheet cutting and creasing press, upper and lower platens coacting to cut and crease successive sheets, a rotary main cam shaft, a cam thereon operatively connected to the lower platen for reciprocating it, a carriage, cams on the main cam shaft for reciprocating the carriage in timed relation to the lower platen, sheet handling devices on the lower platen and carriage, a rotary auxiliary cam shaft and cams thereon operatively connected to the sheet handling devices for operating them in timed relation to one another.

34. In a sheet cutting and creasing press, upper and lower platens coacting to cut and crease successive sheets, a rotary main cam shaft, a cam thereon operatively connected to the lower platen for reciprocating it, a carriage, cams on the said main cam shaft for reciprocating the carriage in timed relation to the lower platen, sheet grippers and suction devices on the carriage and suction devices on the lower platen, an auxiliary cam shaft and cams thereon operatively connected to the sheet grippers and suction devices for operating them in timed relation to one another.

35. In a sheet cutting and creasing press, upper and lower platens coacting to cut and crease successive sheets, a rotary drive shaft, a main cam shaft driven thereby, a cam on the main cam shaft operatively connected to the lower platen for reciprocating it, a carriage, cams on said main cam shaft for reciprocating the carriage in timed relation to the lower platen, sheet handling devices on the lower platen and carriage, an auxiliary cam shaft rotated from the main cam shaft and cams on the auxiliary cam shaft operatively connected to the sheet handling device for operating them in timed relation to one another.

36. In a sheet cutting and creasing press, upper and lower platens coacting to cut and crease successive sheets, a rotary drive shaft, a main cam shaft driven thereby, a cam on the main cam shaft operatively connected to the lower platen for reciprocating it, a carriage, cams on said main cam shaft for reciprocating the carriage in timed relation to the lower platen, sheet grippers and suction devices on the carriage and suction devices on the lower platen, an auxiliary cam shaft rotated from the main cam shaft and cams on the auxiliary cam shaft operatively connected to the sheet grippers and suction devices for operating them in timed relation to one another.

HANS J. LUEHRS.

REFERENCES CITED

The following references are of record in the file of this patent:

UNITED STATES PATENTS

| Number | Name | Date |
| --- | --- | --- |
| 2,176,543 | Norton | Oct. 17, 1939 |
| 2,258,880 | Bobst | Oct. 14, 1941 |
| 1,617,381 | Evers | Feb. 15, 1927 |

Certificate of Correction

Patent No. 2,425,039. August 5, 1947.

HANS J. LUEHRS

It is hereby certified that error appears in the printed specification of the above numbered patent requiring correction as follows: Column 11, line 47, claim 15, after the word "on" first occurrence, strike out "devices on" and insert the same before "said" second occurrence, same line; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*